(No Model.)
M. D. KEENEY.
APPARATUS FOR COOKING PAPER STOCK.
No. 570,640. Patented Nov. 3, 1896.
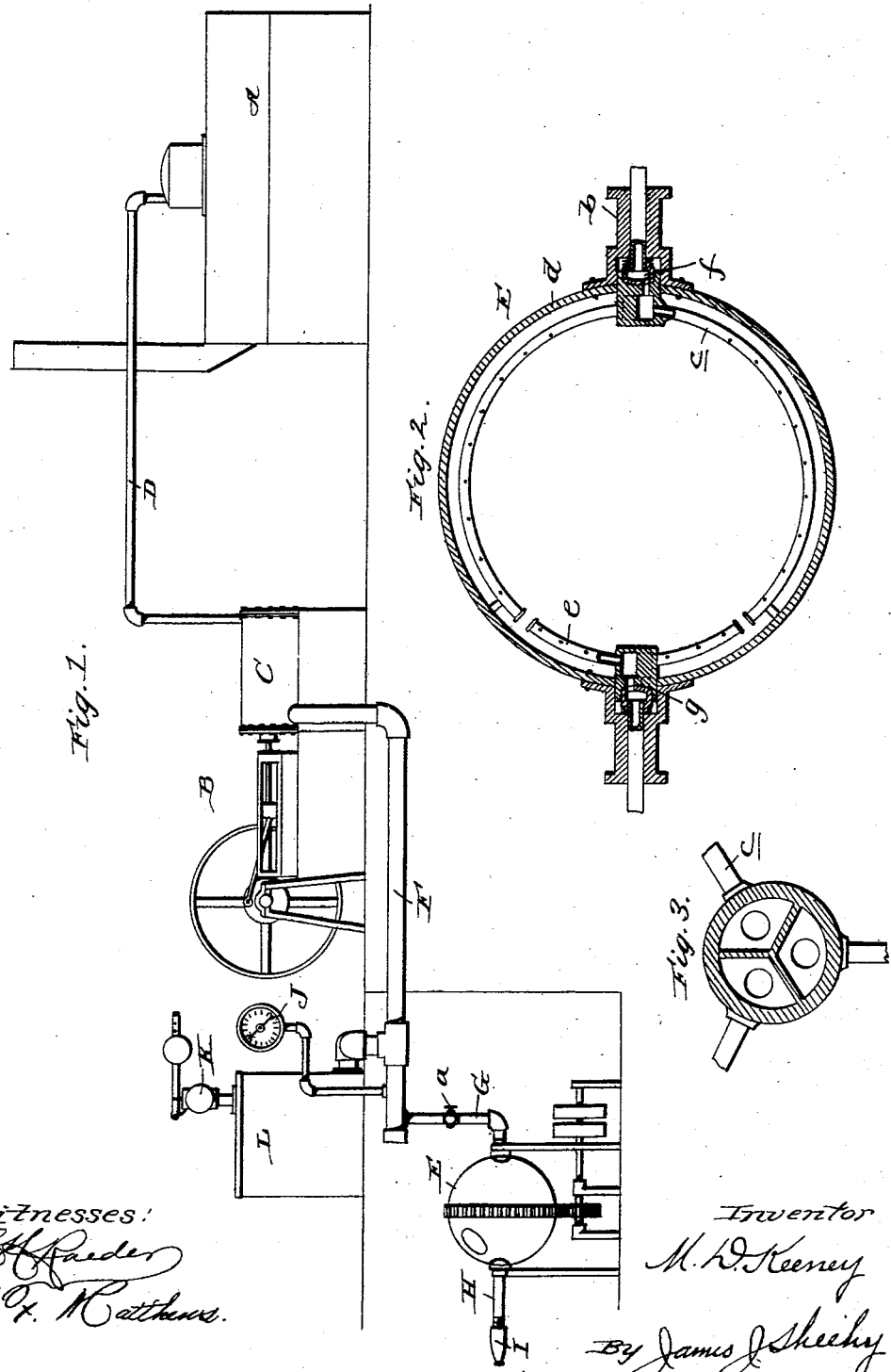

UNITED STATES PATENT OFFICE.

MARBLE D. KEENEY, OF ANTIOCH, CALIFORNIA.

APPARATUS FOR COOKING PAPER-STOCK.

SPECIFICATION forming part of Letters Patent No. 570,640, dated November 3, 1896.

Application filed July 17, 1895. Serial No. 556,248. (No model.)

*To all whom it may concern:*

Be it known that I, MARBLE D. KEENEY, a citizen of the United States, residing at Antioch, in the county of Contra Costa and State of California, have invented certain new and useful Improvements in Processes of and Apparatus for Cooking Paper-Stock; and I do declare the following to be a full, clear, and exact description of the invention, such as will enable others skilled in the art to which it appertains to make and use the same.

My invention relates to improvements in cooking stock for the manufacture of paper.

As is well known to those versed in the art of modern paper-making, the quickest and most thorough known method of cooking paper-stock with steam is to lead steam, under a pressure of between forty and fifty pounds, direct from a steam-generator into a cooker or boiler containing the stock and a suitable cooking liquor, the said cooker or boiler being rotated or otherwise moved to agitate the stock and facilitate the proper cooking of the entire mass by a steam-engine. The generation of steam for supplying the cooker and actuating the engine necessitates the consumption of a large amount of fuel, as is obvious.

The general object of my invention is to obviate the necessity of consuming a large amount of fuel, so as to effect a material saving in the cost of cooking the stock; and to the attainment of this object my invention consists, broadly, in an apparatus by which paper-stock may be cooked with the steam after the same has actuated an engine and become low-pressure steam as quickly and as thoroughly, if not more quickly and thoroughly, than has heretofore been done with high-pressure steam taken directly from a steam-generator.

With the foregoing ends in view the invention will be fully understood from the following description and claims when taken in conjunction with the annexed drawings, in which—

Figure 1 is a view illustrating my improved apparatus complete with the parts connected together. Fig. 2 is an enlarged sectional view of the cooker, and Fig. 3 is a detail section illustrating a portion of the construction of the cooker shown.

In the said drawings similar letters designate corresponding parts in all of the views, referring to which—

A indicates a steam-generator of the ordinary or any suitable construction.

B indicates a steam-engine which may be utilized for driving all or any portion of the machinery of a paper-mill, and may have its piston-cylinder C connected with the generator A by a pipe D in the usual manner.

E indicates a paper-stock cooker, which may be of the rotary or any other desired type.

F indicates a pipe which is connected with the interior of the piston-cylinder by a suitable valve, (not illustrated,) so as to enable it to receive the steam after the same has acted against and moved the piston of the engine.

G indicates a branch pipe connecting the pipe F and the cooker E, and which is designed to conduct the steam coming from the piston-cylinder C to the cooker E, and is preferably provided with a valve $a$, so as to permit of the steam being shut off from the cooker when it is desired to charge or discharge the same, and H indicates the pipe for conducting the steam from the cooker, which is made smaller than the pipe G, or is provided with some suitable means (a nipple I being shown) whereby the discharge of the steam from the rotary or cooker may be retarded when desired without being discontinued, for a purpose presently described.

As illustrated in Fig. 1, the pipe F is preferably equipped with a pressure-gage J and with a back-pressure-regulating valve K. The valve K may be of the usual puppet type, as shown, or of any other suitable construction, and it may be connected directly with the pipe F when desired. I prefer, however, to interpose a suitable feed-water heater L between the pipe F and valve K, as shown, so as to utilize the steam, which would otherwise pass through the valve and be wasted, for heating the water fed to the boiler. This heating of the feed-water renders it possible to generate it into steam with much less heat than would be necessary were it not heated, and thus the back pressure of about five pounds imposed on the piston of the engine B is more than counteracted.

As before stated, any suitable construction of cooker may be employed in my improved apparatus, but, as experience has demonstrated that rotary cookers are the best, I prefer to employ such a cooker and one embodying the construction shown in the drawings. The cooker E illustrated is of a general spherical form, and it comprises the hollow body $d$, the hollow trunnions $b$ to receive the pipes G and H, the three (more or less) perforated pipes $c$, which are connected and adapted to move with the body and are designed to lead the steam from the pipe G into the stock in the cooker, the three (more or less) perforated pipes $e$, which are also connected and adapted to move with the body and are adapted to lead steam from the interior of the cooker to the pipe H, a valve device $f$, of the ordinary or any suitable construction, adapted to effect communication between the pipe G and each of the pipes $c$ when said pipes are in the stock and also adapted to close communication between the pipe G and each of the pipes $c$ when said pipes are above or out of the stock, and a similar valve device $g$, adapted to effect communication between the pipe H and each of the pipes $e$ when said pipes are above or out of the stock and also adapted to close communication between the pipe H and each of the pipes $e$ when said pipes are in the stock. By this construction a free and continuous passage for the steam is afforded through the cooker, which is an essential feature of my invention, and at the same time the steam is compelled to pass through the stock.

In the practice of my invention I maintain a steam-pressure of from eighty (80) to one hundred (100) pounds in the generator and use this steam to actuate the engine B, which in turn may be utilized to run all or any portion of the machinery of the paper-mill. After acting against and moving the piston of the engine B the steam, which is then low-pressure steam, passes continuously and without cessation through the pipes F and G, the cooker E and stock therein, and the pipe H, and serves to cook the stock, as will be presently more fully described.

For ordinary purposes a pressure of five pounds—that is to say, five pounds plus the atmospheric pressure—is maintained in the cooker E by suitably adjusting the valve K and retarding the passage of the steam from the said cooker—that is to say, preventing the steam from passing out of the cooker as quickly as it passes into the same. This retarding of the passage of steam from the cooker may be effected by making the pipe H smaller than the pipe G or by providing the said pipe H with a valve or other retarding device or construction or by making the pipe H about the size shown and providing it on one end with the nipple I, having its discharge end reduced or contracted, as shown. This latter mode is a preferable one, as it permits of the operator removing the nipple I and replacing it with one having a smaller discharge for a purpose presently to be brought out.

I have found from experience that by maintaining about five pounds of steam-pressure in the cooker E, as described, I am enabled to cook stock in the same time and as thoroughly, if not more thoroughly, than is done at present with forty pounds of steam taken direct from a generator, and this without using any chemicals that are not used when the high-pressure steam is employed. Indeed, practice has shown me that in cooking stock with forty pounds or more of high-pressure steam the high pressure blackens, burns, and weakens the fiber and yet does not change the form of the stock. For instance, straw-stock delivered to a high-pressure cooker comes out too long to handle with a pump, and no attempt has been made to so handle it. On the other hand, stock cooked in my cooker with a pressure of five pounds of steam is not blackened, nor is its fiber weakened, and when straw-stock is cooked it is delivered from the rotary reduced to fiber so fine that it can be handled with a pump in the same manner that pulp is handled.

As above stated, stock may be cooked as quickly and as thoroughly in my improved cooker with a pressure of five pounds of steam as has been heretofore done in high-pressure cookers with a pressure of forty pounds of steam, and by diminishing the discharge of the cooker it may be cooked quicker and yet equally as well. The diminishing of the discharge of the cooker is effected, as before stated, by removing the nipple I and replacing it with one having a more contracted or smaller discharge-opening. While the size of the discharge from the cooker may be varied, as stated, yet it will be seen that the passage of steam through the cooker is continuous and without cessation. By reason of this the back pressure upon the piston of the engine is reduced to a minimum and the five pounds of steam-pressure is enabled to cook the stock, as stated.

It will be appreciated from the foregoing that inasmuch as I utilize steam after it has operated an engine to cook the stock the cooking may be done much cheaper than by the present mode, which necessitates the provision of separate steam-generators for the cookers and the consumption of a large amount of fuel to heat the same. It will also be appreciated that with my process and apparatus the stock may be cooked equally as well and in the same time and indeed quicker and better than has heretofore been done with high-pressure steam.

Having described my invention, what I claim is—

1. In an apparatus for cooking paper-stock with steam, a paper-stock cooker substantially as and for the purpose described, having a continuously-open induction-passage and a continuously-open eduction-passage for steam; the said eduction-passage being reduced as compared to the induction-passage so as to retard the passage of steam through the cooker without discontinuing the said passage.

2. An apparatus for cooking paper-stock with steam, comprising a steam-generator, a steam-engine, a pipe connecting the generator and the piston-cylinder of the engine, a paper-stock cooker having a continuously-open induction-passage and a continuously-open eduction-passage for steam; the said eduction-passage being reduced as compared to the induction-passage so as to retard the passage of steam through the cooker without discontinuing the said passage, and a conduit connected with the piston-cylinder of the engine so as to receive steam therefrom after it has acted upon the piston and also connected with the induction-passage of the cooker, substantially as specified.

3. An apparatus for cooking paper-stock with steam comprising a steam-generator, a steam-engine, a pipe connecting the generator and the piston-cylinder of the engine, a paper-stock cooker having a continuously-open induction-passage and a continuously-open eduction passage for steam; the said eduction-passage being reduced as compared to the induction-passage so as to retard the passage of steam through the cooker without discontinuing the said passage, a conduit connected with the piston-cylinder of the engine so as to receive steam therefrom after it has acted upon the piston and also connected with the induction-passage of the cooker, a valve device for regulating the pressure in said conduit, and a feed-water heater interposed between said valve device and the conduit, all substantially as specified.

In testimony whereof I affix my signature in presence of two witnesses.

MARBLE D. KEENEY.

Witnesses:
   JOS. H. BLACKWOOD,
   K. F. MATTHEWS.